UNITED STATES PATENT OFFICE.

OSKAR KALTWASSER, OF BERLIN, GERMANY, ASSIGNOR TO THE ACTIEN-GESELLSCHAFT FÜR ANILIN FABRIKATION, OF SAME PLACE.

GREEN-BLACK SULFUR DYE.

SPECIFICATION forming part of Letters Patent No. 651,077, dated June 5, 1900.

Application filed March 8, 1900. Serial No. 7,810. (No specimens.)

*To all whom it may concern:*

Be it known that I, OSKAR KALTWASSER, of Berlin, in the Kingdom of Prussia, German Empire, have invented new and useful Improvements in the Production of Greenish-Black Dye; and I do hereby declare that the following is a full, clear, and exact description of the invention, which will enable others skilled in the art to which it appertains to make and use the same.

This invention relates to the production of a new black coloring-matter and is based on the observation that the dinitrochloro-oxydiphenylamin represented by the following formula

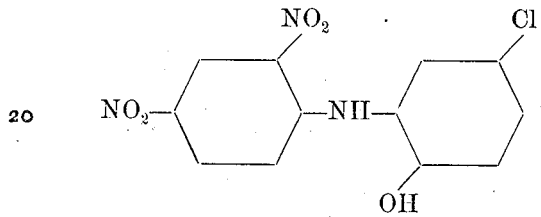

when melted with sulfur and sulfids of alkali metals is transformed into sulfur dye, which produces on unmordanted cotton greenish-black shades of great intensity.

As the dinitrochloro-oxydiphenylamin above mentioned has not yet been described heretofore, the following directions may be given for its preparation: Fifteen kilos of ortho-amido-para-chlorophenol are dissolved in seven hundred and fifty liters of hot water. To the solution obtained eleven kilos of sodium carbonate and 20.5 kilos of dinitrochlorobenzene are added and the mixture is boiled for several hours. On refrigeration the condensation product separates in the shape of red needles. It is insoluble in water, easily soluble in hot alcohol, and dissolves in concentrated sulfuric acid, forming a yellow solution. From the dinitrochlorooxydiphenylamin thus produced my new dyestuff may be obtained as follows: Fifty kilos of sodium sulfid, twenty kilos of sulfur, and fifteen liters of water are heated together, and ten kilos of dinitrochloro-oxydiphenylamin are added thereto at about 50° centigrade. The temperature is raised thereupon and maintained, at least for several hours, at 140° to 150° centigrade. In order to isolate the dyestuff, the heating is continued at a somewhat-higher temperature until the mass is perfectly dry and may be pulverized, or after dissolving the melt in water the dyestuff is precipitated from the aqueous solution obtained by addition of a mineral acid or by introduction of a current of air. The coloring-matter manufactured in this way dissolves easily in a diluted aqueous solution of sodium sulfid with intense blue-green coloration, which on addition of caustic alkalies turns brown violet. From its aqueous solution the dyestuff separates on addition of mineral acids or acetic acid in the shape of a brown-black precipitate. By means of common salt it is precipitated as a green-black powder. It is insoluble in alcohol. On heating the aqueous solution of the dyestuff with zinc-dust and caustic-soda lye, it is readily reduced and a light-brown liquid is obtained, which on exposure to air assumes again the dark coloration of the original solution of the dyestuff.

My new coloring-matter dissolves in concentrated sulfuric acid with dirty brown-green coloration, which on heating turns black violet. It dissolves likewise in fuming sulfuric acid of twenty-three per cent. $SO_3$ with black-green coloration. Both solutions yield black-violet precipitates on dilution with ice-water.

Having now described my invention and in what manner the same is to be carried out, what I claim as new is—

The black dye produced by melting with sulfur and sulfids of alkali metals dinitrochloro-oxydiphenylamin of the constitutional formula:

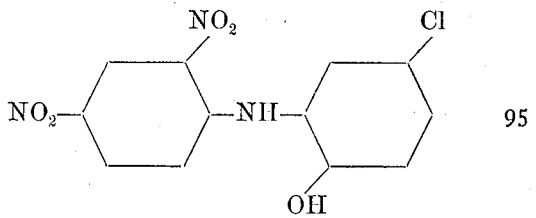

said dye being insoluble in alcohol, easily soluble in water containing some sodium sulfid with intense blue-green coloration, which on addition of caustic-soda lye turns brown violet; the dye being precipitated from its aqueous solution by means of common salt as a green-black powder, on addition of mineral acids or acetic acid or by a current of air as a brown-black powder; being soluble in concentrated sulfuric acid with dirty brown-green coloration, turning black violet on heating, likewise soluble in fuming sulfuric acid of twenty-three per cent. with black-green coloration, both solutions yielding black-violet precipitates on addition of ice-water; forming on reduction with zinc-dust and caustic-soda lye a light-brown solution, which on exposure to air assumes the original dark color of the dyestuff; the new coloring-matter dyeing unmordanted cotton greenish-black shades of great intensity.

In witness whereof I have hereunto signed my name, this 21st day of February, 1900, in the presence of two subscribing witnesses.

OSKAR KALTWASSER.

Witnesses:
 WOLDEMAR HAUPT,
 HENRY HASPER.